United States Patent
Priest

(10) Patent No.: US 10,150,661 B2
(45) Date of Patent: Dec. 11, 2018

(54) TELESCOPING PLATFORM FOR OPERATIONS ON CELL TOWERS

(71) Applicant: Lee Priest, Charlotte, NC (US)

(72) Inventor: Lee Priest, Charlotte, NC (US)

(73) Assignee: ETAK Systems, LLC, Huntersville, NC (US)

( * ) Notice: Subject to any disclaimer, the term of this patent is extended or adjusted under 35 U.S.C. 154(b) by 169 days.

(21) Appl. No.: 15/235,686

(22) Filed: Aug. 12, 2016

(65) Prior Publication Data

US 2018/0044154 A1   Feb. 15, 2018

(51) Int. Cl.
*B66F 11/04* (2006.01)
*A01M 31/02* (2006.01)

(52) U.S. Cl.
CPC .............. *B66F 11/04* (2013.01); *A01M 31/02* (2013.01)

(58) Field of Classification Search
CPC ........ A01M 31/02; B66F 11/04; B66F 11/046
See application file for complete search history.

(56) References Cited

U.S. PATENT DOCUMENTS

| | | | | |
|---|---|---|---|---|
| 713,911 A * | 11/1902 | McPartland | ............ | B66F 11/04 14/31 |
| 1,337,487 A * | 4/1920 | Schlatter | ................. | B66F 11/04 182/141 |
| 3,000,473 A * | 9/1961 | Reynolds | ................ | B66F 11/04 182/69.4 |
| 3,312,487 A * | 4/1967 | McIntyre | ................ | E04H 12/34 285/302 |
| 3,457,685 A * | 7/1969 | Stein | ....................... | B66F 11/04 182/41 |
| 3,729,063 A * | 4/1973 | Hein | ....................... | E06C 1/381 182/156 |
| 3,882,964 A * | 5/1975 | Schellenberg | .......... | B66F 11/04 182/69.4 |
| 4,231,200 A * | 11/1980 | Henderson | ............ | E04H 12/182 182/19 |
| 4,442,919 A * | 4/1984 | Fulcher | ..................... | E04G 1/28 182/115 |
| 4,592,446 A * | 6/1986 | White | ..................... | E06C 1/125 182/100 |
| 4,614,252 A * | 9/1986 | Tarner | .................... | A01M 31/02 182/116 |
| 4,699,248 A * | 10/1987 | Roy | ........................ | E06C 1/381 182/116 |
| 5,533,593 A * | 7/1996 | Huang | ..................... | B66B 9/16 182/141 |

(Continued)

FOREIGN PATENT DOCUMENTS

DE    102009026866 A1 * 12/2010    ............ B66F 11/046

*Primary Examiner* — Colleen M Chavchavadze

(74) *Attorney, Agent, or Firm* — Clements Bernard Walker PLLC; Lawrence A. Baratta, Jr.

(57) ABSTRACT

A telescoping platform system for providing workers and/or equipment up a cell tower includes a telescoping pole adapted to selectively extend vertically via an extension mechanism; a platform disposed to a top of the telescoping pole and adapted to support one or more workers and/or equipment for the cell tower; and a plurality of support connections to attach the telescoping pole while it is selectively extended to the cell tower to provide horizontal support to the telescoping pole and the platform.

9 Claims, 7 Drawing Sheets

(56) References Cited

U.S. PATENT DOCUMENTS

| | | | | |
|---|---|---|---|---|
| 7,163,082 B2* | 1/2007 | Bigard | ................ | A01M 31/02 |
| | | | | 182/100 |
| 7,231,741 B2* | 6/2007 | Norwood | ............. | B66C 23/703 |
| | | | | 212/231 |
| 7,237,649 B2* | 7/2007 | Harmston | ................ | E06C 1/10 |
| | | | | 182/93 |
| 9,108,831 B2* | 8/2015 | Beji | ....................... | B66F 11/04 |
| 9,309,662 B2* | 4/2016 | Vazquez | ............. | E04B 1/34352 |
| 9,748,639 B2* | 8/2017 | Newman | ............. | H01Q 1/1235 |
| 9,803,422 B2* | 10/2017 | Johnson | ................ | E06C 1/397 |
| 2002/0157899 A1* | 10/2002 | Smith | ................ | A01M 31/02 |
| | | | | 182/63.1 |
| 2007/0169996 A1* | 7/2007 | Blue | ................... | A01M 31/02 |
| | | | | 182/141 |
| 2008/0302601 A1* | 12/2008 | Baker | ..................... | B66B 9/16 |
| | | | | 182/69.4 |
| 2015/0252616 A1* | 9/2015 | Collyer | .............. | A01M 31/025 |
| | | | | 182/115 |

* cited by examiner

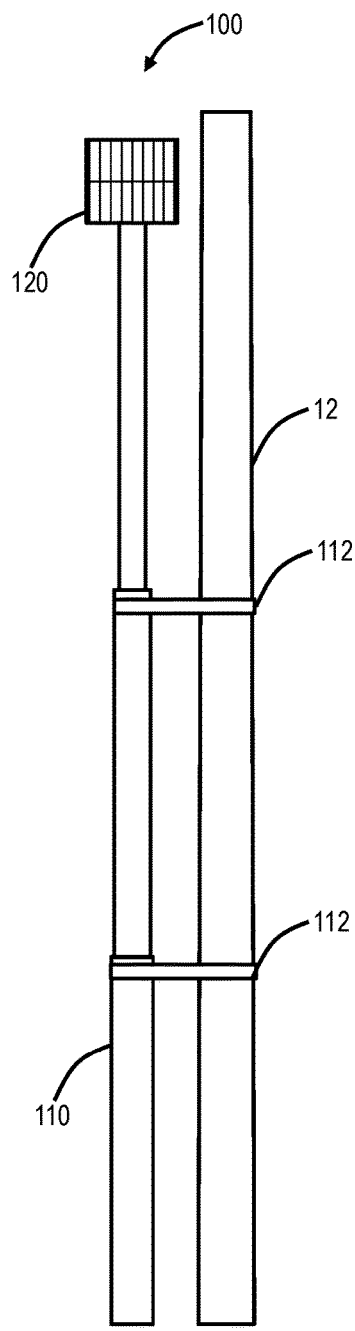
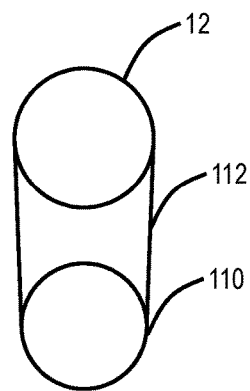
FIG. 4
FIG. 3

TELESCOPING PLATFORM FOR OPERATIONS ON CELL TOWERS

FIELD OF THE DISCLOSURE

The present disclosure generally relates to telescoping platform systems and methods. More particularly, the present disclosure relates to a telescoping platform system and method for operations on cell towers that offers safety.

BACKGROUND OF THE DISCLOSURE

Due to the geographic coverage nature of wireless service, there are hundreds of thousands of cell towers in the United States. For example, in 2014, it was estimated that there were more than 310,000 cell towers in the United States. Cell towers can have heights up to 1,500 feet or more. There are various requirements for cell site workers (also referred to as tower climbers or transmission tower workers) to climb cell towers to perform maintenance, audit, and repair work for cellular phone and other wireless communications companies. This is both a dangerous and costly endeavor. For example, between 2003 and 2011, 50 tower climbers died working on cell sites (see, e.g., www.pbs.org/wgbh/pages/frontline/social-issues/cell-tower-deaths/in-race-for-better-cell-service-men-who-climb-towers-pay-with-their-lives/). Also, OSHA estimates that working on cell sites is 10 times more dangerous than construction work, generally (see, e.g., www.propublica.org/article/cell-tower-work-fatalities-methodology). Furthermore, the tower climbs also can lead to service disruptions caused by accidents. Thus, there is a strong desire, from both a cost and safety perspective, to reduce the number of tower climbs.

It would be advantageous to have a mechanism to allow cell site workers to reach up a cell tower, without having to perform a dangerous tower climb. Any such mechanism requires safety, stability, accessibility, mobility, etc.

BRIEF SUMMARY OF THE DISCLOSURE

In an exemplary embodiment, a telescoping platform system for providing workers and/or equipment up a cell tower includes a telescoping pole adapted to selectively extend vertically via an extension mechanism; a platform disposed to a top of the telescoping pole and adapted to support one or more workers and/or equipment for the cell tower; and a plurality of support connections to attach the telescoping pole while it is selectively extended to the cell tower to provide horizontal support to the telescoping pole and the platform. The telescoping pole can include N sections each with a length M to provide an extension of the platform to a height of about N×M, wherein N and M are selected based on the one of a bed and a trailer and a desired height for the cell tower. The telescoping pole and the platform can be configured in a transport position substantially horizontal and an operating position substantially vertical. The workers enter and exit the platform in an initial operating position and the equipment is placed in the platform in the transport position. The workers can be secured to the platform via a safety harness.

The plurality of support connections can include one or more of tethers, clips, straps, arms, and robotic arms. The robotic arms, clips, and arms can be automatically attached to the cell tower as the telescoping pole is selectively extended. The clips, tethers, arms, and straps can be manually attached to the cell tower by one of the workers as the telescoping pole is selectively extended. The cell tower can include one of a monopole tower and a guyed tower with the plurality of support connections attached thereto. The telescoping platform system can further include a mobile unit comprising one of a trailer and a bed for transporting the telescoping pole and the platform attached thereto in a transport position. The extension mechanism can be further configured to rotate the telescoping pole and the platform attached thereto about ninety degrees between a transport position and an operating position. The telescoping pole can include a plurality of sections with a climbing mechanism attached to a first section allowing the workers to enter the platform once the operating position is achieved. The platform can include a securing mechanism to hold the equipment in the transport position.

In another exemplary embodiment, a mobile unit with a telescoping platform for providing workers and/or equipment up a cell tower includes one of a bed and a trailer; a telescoping pole on the one of the bed and the trailer, wherein the telescoping pole is adapted to selectively extend vertically via an extension mechanism; a platform disposed to a top of the telescoping pole and adapted to support one or more workers and/or equipment for the cell tower; and a plurality of support connections to attach the telescoping pole while it is selectively extended to the cell tower to provide horizontal support to the telescoping pole and the platform. The telescoping pole can include N sections each with a length M to provide an extension of the platform to a height of about N×M, wherein N and M are selected based on the one of the bed and the trailer and a desired height for the cell tower. The extension mechanism can be further configured to rotate the telescoping pole and the platform attached thereto about ninety degrees between a transport position and an operating position. The telescoping pole can include a plurality of sections with a climbing mechanism attached to a first section allowing the workers to enter the platform once the operating position is achieved. The platform can include a securing mechanism to hold the equipment in the transport position.

In a further exemplary embodiment, a method of performing operations on a cell tower with a telescoping platform includes positioning a telescoping platform system proximate to the cell tower, wherein the telescoping platform includes a telescoping pole adapted to selectively extend vertically via an extension mechanism; a platform disposed to a top of the telescoping pole and adapted to support one or more workers and/or equipment for the cell tower; and a plurality of support connections to attach the telescoping pole while it is selectively extended to the cell tower to provide horizontal support to the telescoping pole and the platform; selectively extending the telescoping pole with one or more a worker, workers, and equipment therein; and selectively engaging the plurality of support connections to the cell tower during the selectively extending. The telescoping pole can include N sections each with a length M to provide an extension of the platform to a height of about N×M, wherein N and M are selected based on the one of the bed and the trailer and a desired height for the cell tower.

BRIEF DESCRIPTION OF THE DRAWINGS

The present disclosure is illustrated and described herein with reference to the various drawings, in which like reference numbers are used to denote like system components/method steps, as appropriate, and in which:

FIG. 3 is a perspective diagram of the telescoping platform extended and secured to the cell tower of FIG. 1 or 2;

FIG. 4 is a cross-sectional view of a telescoping pole connected to the cell tower of FIG. 1 or 2 with support connections;

DETAILED DESCRIPTION OF THE DISCLOSURE

In various exemplary embodiments, the present disclosure relates to telescoping platform systems and methods for operations on cell towers. Specifically, the systems and methods include a telescoping platform, a mobile unit with the telescoping platform, and an associated method of use. The telescoping platform can include space for a few workers (e.g., 1-3) along with optional cargo (e.g., antennas or other equipment for the cell tower). The telescoping platform can be configured to raise/lower vertically up several hundred feet to provide a safe means of reaching cell site components on the cell tower. In an exemplary embodiment, the telescoping platform is used with monopole cell towers and guyed cell towers, i.e., towers with a substantially cylindrical based. Further, to improve safety and provide support, the telescoping platform is configured to attach or connect to the cell tower at various intervals while raising. Thus, once at the desired height, the telescoping platform maintains horizontal stability along with vertical stability. The mobile unit allows the telescoping platform to be used at various different cell sites. Advantageously, the telescoping platform enables cell site workers to reach up the cell tower in a few minutes instead of a dangerous and timely tower climb which could take over an hour and does not allow equipment to be transported with the workers.

§ 1.0 Exemplary Cell Site

Figure 1:
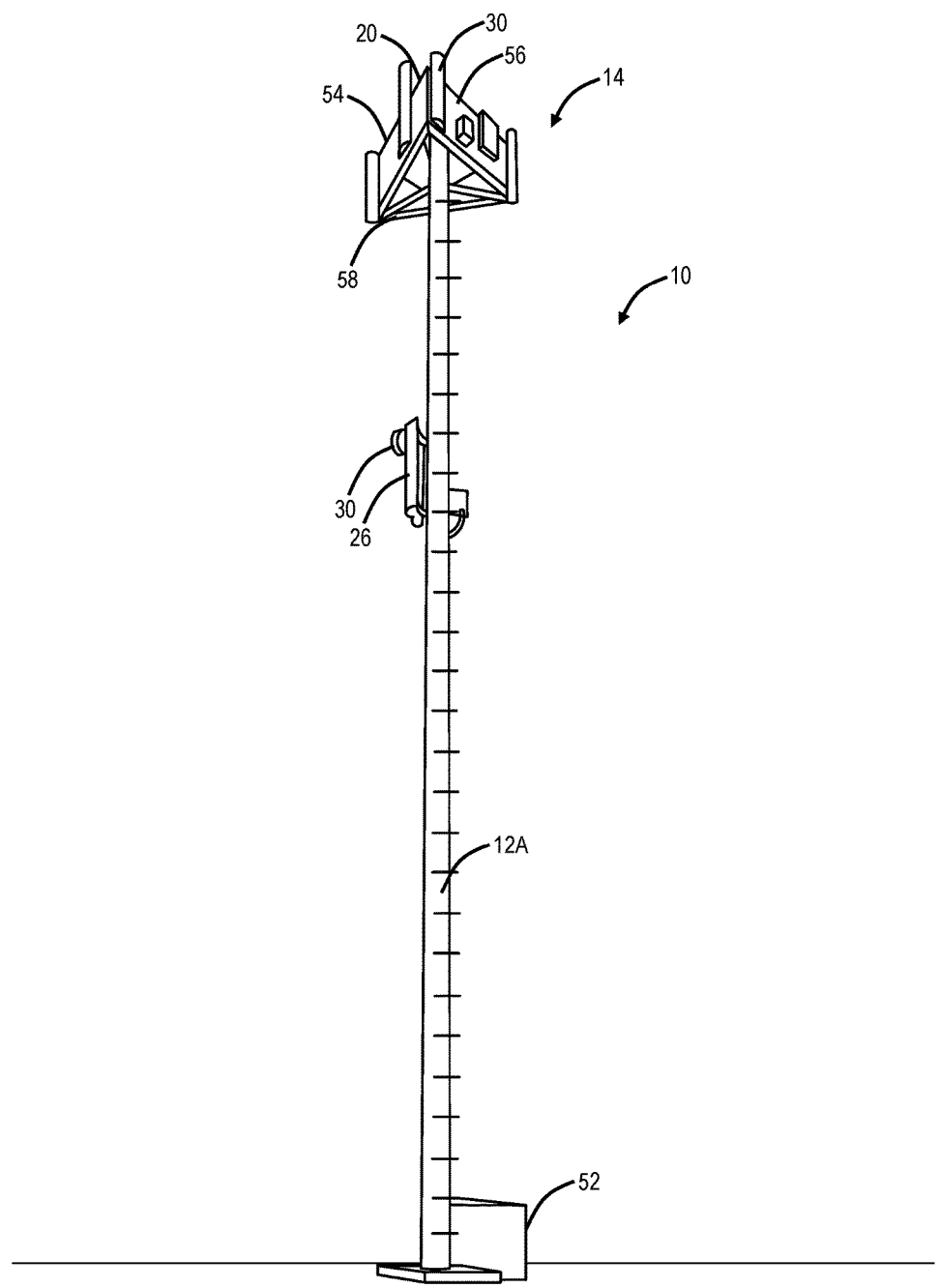
FIGS. 1 and 2 are diagrams of a side view of an exemplary cell site 10 with a monopole cell tower (FIG. 1) and a guyed cell tower (FIG. 2)
Figure 2:
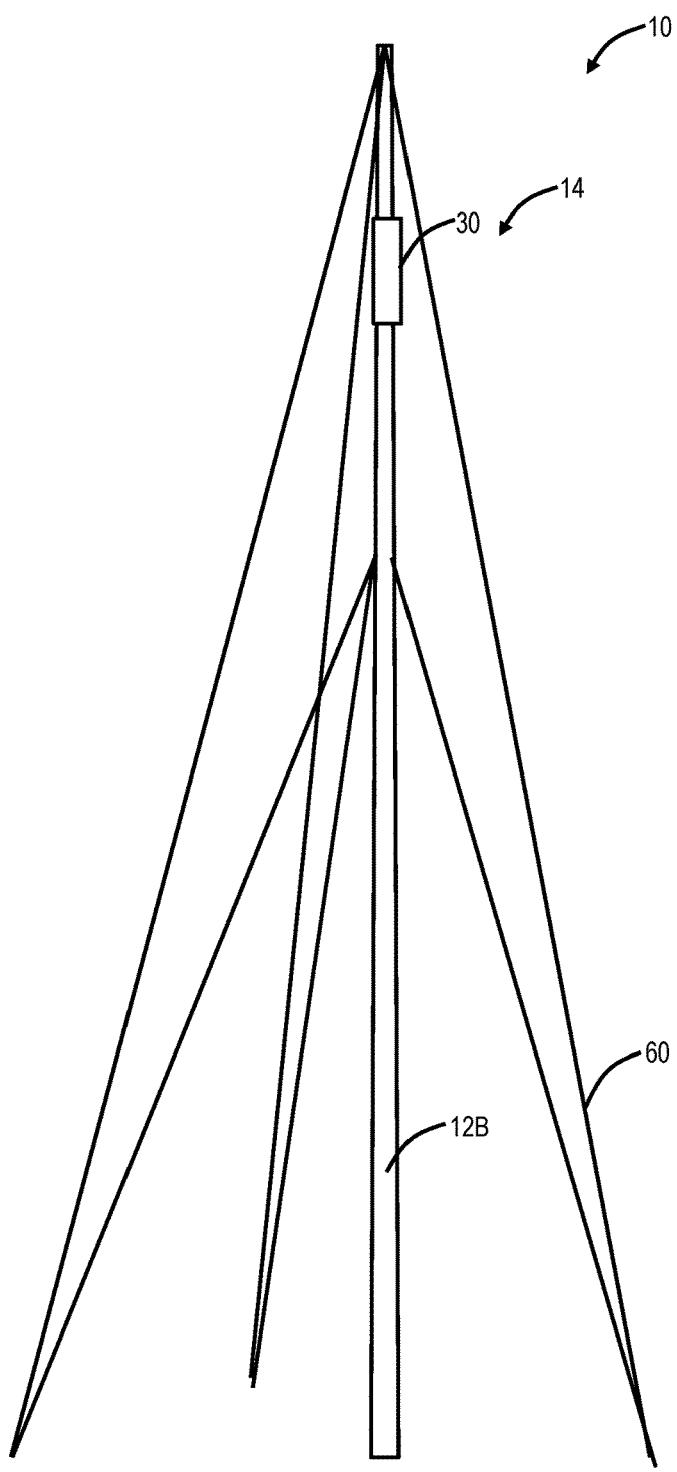

Referring to FIGS. 1 and 2, in an exemplary embodiment, diagrams illustrates a side view of an exemplary cell site 10 with a monopole cell tower 12A (FIG. 1) and a guyed cell tower 12B (FIG. 2). The cell site 10 includes a cell tower 12 (either the monopole cell tower 12A or the guyed cell tower 12B). The cell tower 12 can be any type of elevated structure, such as 100-200 feet/30-60 meters tall. Generally, the cell tower 12 is an elevated structure for holding cell site components 14. The cell tower 12 may also include a lighting rod, a warning light, etc. Of course, there may various additional components associated with the cell tower 12 and the cell site 10 which are omitted for illustration purposes. In this exemplary embodiment, there are sets 20, 26 of cell site components 14, such as for different wireless service providers. In this example, the sets 20 include various antennas 30 for cellular service. The sets 20 are deployed in sectors, e.g. there can be three sectors for the cell site components —alpha, beta, and gamma. The antennas 30 are used to both transmit a radio signal to a mobile device and receive the signal from the mobile device. The antennas 30 are usually deployed as a single, groups of two, three or even four per sector. The higher the frequency of spectrum supported by the antenna 30, the shorter the antenna 30. For example, the antennas 30 may operate around 850 MHz, 1.9 GHz, and the like. The set 26 includes a microwave dish 32 which can be used to provide other types of wireless connectivity, besides cellular service. There may be other embodiments where the cell tower 12 is omitted and replaced with other types of elevated structures such as roofs, water tanks, etc.

To support the various cell site components and their operation thereof, the cell site 10 includes a shelter 50 (which can also be referred to as a cabinet, house, etc.) which include electronics and other networking equipment to support the functionality and operation. In the example of FIG. 1, the cell tower 12A is a monopole tower which includes a cylindrical base that is free standing to support the cell site components 14. The monopole cell tower 12A can include climbing supports along with pegs, clips, etc. for safely securing a climber.

In the example of FIG. 2, the cell tower 12B is a guyed tower 12B which is a straight rod supported by guide wires 60 attached to the ground. The guide wires 60 generally attach to the straight rod at the same place at different heights on the straight rod, e.g., every 100', 200', etc. Similar to the monopole cell tower 12A, the guyed tower 12B can include climbing supports along with pegs, clips, etc. for safely securing a climber.

§ 2.0 Telescoping Platform

Figure 5:
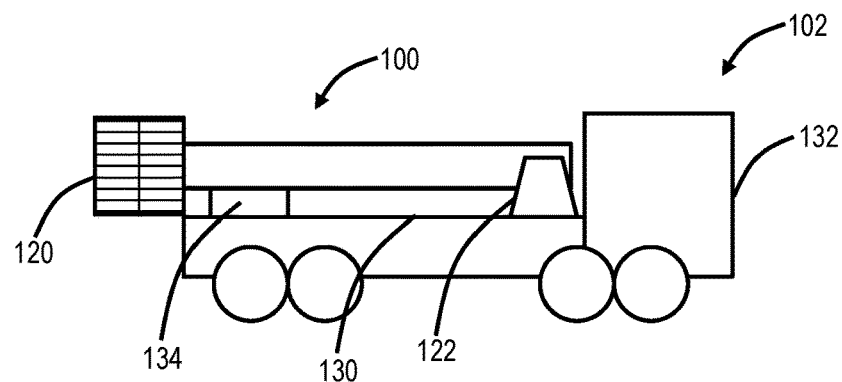
FIG. 5 is a perspective diagram of the mobile unit with the telescoping platform in a transport position.
Figure 6:
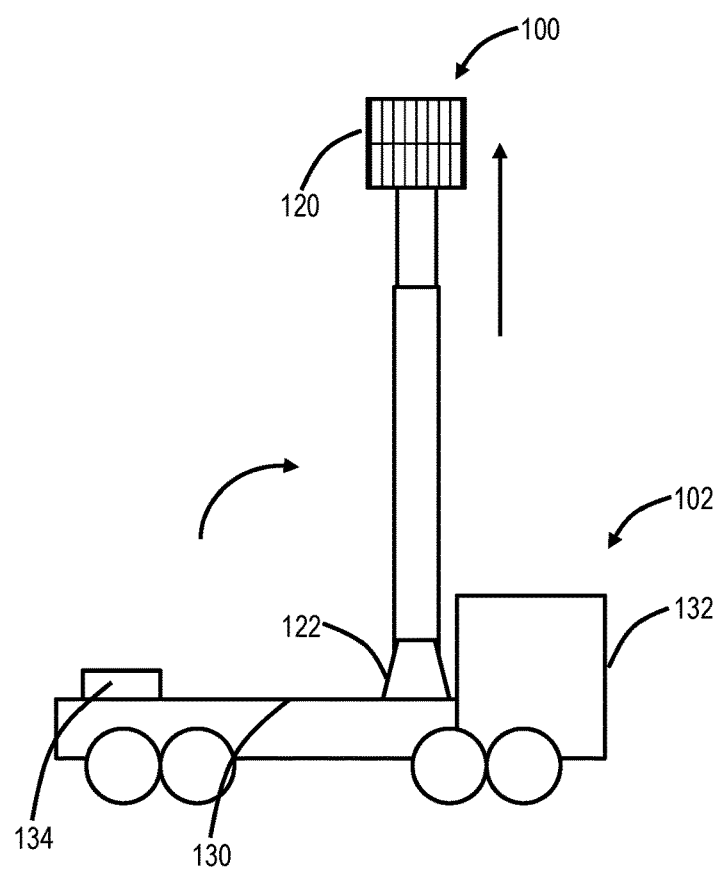
FIG. 6 is a perspective diagram of the mobile unit with the telescoping platform in process of raising in an operating position.
Figure 7:
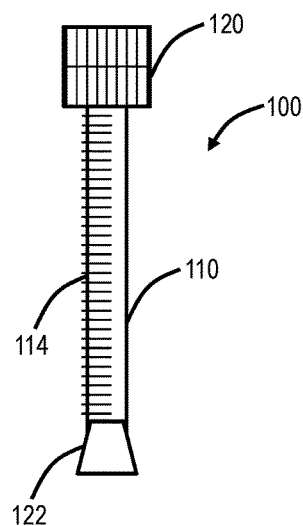
FIG. 7 is a perspective diagram of the telescoping platform illustrating a ladder on a first section of the telescoping pole allowing workers to reach a platform on top of the telescoping pole.
Figure 8:
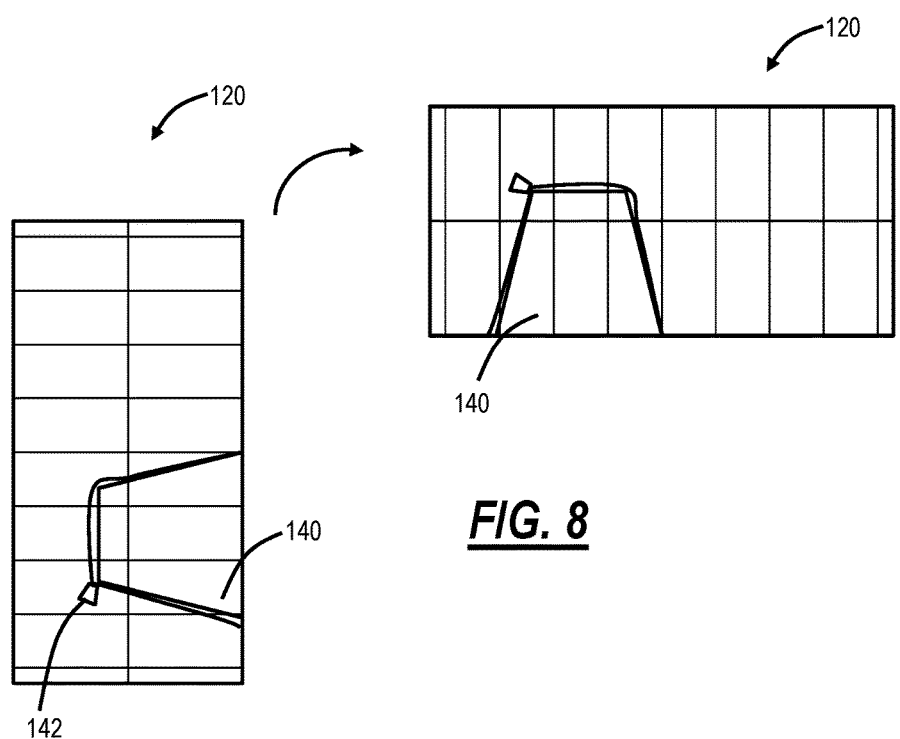
FIG. 8 is a perspective view of the platform illustrating equipment placed and secured therein in the transport position and moved to the operating position.

Referring to FIGS. 3-8, in an exemplary embodiment, various diagrams illustrate a telescoping platform 100 and a mobile unit 102 for the telescoping platform 100. FIG. 3 is a perspective diagram of the telescoping platform 100 extended and secured to the cell tower 12. FIG. 4 is a cross-sectional view of a telescoping pole 110 (i.e., a mast) connected to the cell tower 12 with support connections 112. FIG. 5 is a perspective diagram of the mobile unit 102 with the telescoping platform 100 in a transport position. FIG. 6 is a perspective diagram of the mobile unit 102 with the telescoping platform 100 in the process of raising in an operating position. FIG. 7 is a perspective diagram of the telescoping platform 100 illustrating a ladder 114 or some other climbing mechanism (e.g. steps, pegs, etc.) on a first section of the telescoping pole 110 allowing workers to reach a platform 120 on top of the telescoping pole 110. FIG. 8 is a perspective view of the platform 120 illustrating equipment 116 placed and secured therein in the transport position and moved to the operating position.

In FIG. 3, the telescoping platform 100 is shown extended to a desired position relative to the cell tower 12, a location where the cell site components 14 being worked on are located. The platform 120 is configured to support one to three workers along with optional equipment. The workers' safety is maintained as the workers do not climb the tower 12 but rather are lifted vertically via the platform 120 and the telescoping pole 110. The workers can also clip onto safety harnesses located in the platform 120 for additional safety.

The telescoping pole 110 can extend a couple hundred feet to support heights up to the top of the cell tower 12. The telescoping pole 110 is extended by an extension mechanism 122 which can include any mechanical technique to raise/lower the telescoping pole 110, such as a motor, a hydraulic motor, an electric motor, a gas powered motor, various gears, etc. It is expected that, with three workers and equipment, the platform 120 can be raised to the top of the cell tower 12 over several minutes which is a significant improvement from a tower climb which could take an hour.

One particular problem with the platform 120 being a couple hundred feet in the air vertically proximate to the cell tower 12 is horizontal drift. Specifically, the platform 120 at, for example, 200' is unsafe and risks toppling over as the workers shift and move on the platform 120. Thus, to provide stability, the telescoping pole 110 is configured to attach or connect to the cell tower 12 at various locations via the support connections 112. The support connections 112 can be tethers, clips, straps, arms, robotic arms, etc. that are configured to connect to the cell tower 12 to provide support for the telescoping pole 110.

The support connections 112 are attached, either automatically for the robotic arms, clips, arms, or manually with the workers for clips, tethers, arms, straps, etc. The support connections 112 are attached as the telescoping pole 110 extends. In an exemplary embodiment, the support connections 112 are attached at various heights along the cell tower 12, such as every 10', 20', 30', etc.

As shown in FIG. 4, in an exemplary embodiment, the support connections 112 wrap around the entire pole of the cell tower 12, which is why the telescoping platform 100 operates with the cell towers 12A, 12B (instead of a lattice tower). In another exemplary embodiment, the support connections 112 clip on, i.e., do not extend around the circumference of the pole of the cell tower 12 to provide horizontal stability. In a further exemplary embodiment, the support connections 112 connect to pegs, clips, poles, etc. on the cell tower 12, such as those used for safely connecting workers during a tower climb.

On the descent of the telescoping pole 110, the support connections 112 are disconnected/removed as the telescoping pole 110 is lowered. Thus, the support connections 112 are temporary supports ensuring the platform 120 does not sway, topple, or move during operations on the cell tower 12.

In FIGS. 5 and 6, the mobile unit 102 is illustrated with the telescoping platform 100 integrated on a bed 130 of a truck or the like. The truck can be a flat bed, semi-trailer, or full trailer. The mobile unit 102 includes a cab 132 for a driver and an engine or the like. The bed 130 is attached or connected to the cab 132. In the transport position, the telescoping platform 100 can be tens of feet, capable of being transported on roads and highways and can be supported by a support 134 located on the bed 130. The telescoping pole 110 can be locked to the support 134 in the transport position.

The telescoping pole 110 includes N sections each of M feet, thereby supporting heights of N×M. In an exemplary embodiment, each section is 20' and there are ten sections for 200' height. Other embodiments are also contemplated. The size of the M feet can be based on the mobile unit 102 and considerations associated with transport on road and highways.

Alternatively, the telescoping platform 100 can be part of a trailer which is hitched to another vehicle. In yet another exemplary embodiment, the telescoping platform 100 can be mobile itself with wheels and propulsion. In a further exemplary embodiment, the telescoping platform 100 can be part of or made with a crane. Various other embodiments are also contemplated.

The mobile unit 102 in FIG. 5 is configured to drive on roads, highways, gravel, etc. to bring the telescoping platform 100 to a location proximate to the cell tower. Once the mobile unit 102 is positioned proximate to the cell tower 12, the telescoping platform 100 is configured to deploy as shown in FIG. 6.

To deploy the telescoping platform 100 from the transport position to the operating position, first, the telescoping pole 110 is unlocked from the support 134. Next, the telescoping pole 110 with the platform 120 is raised from a lateral, horizontal position to a vertical position. This movement can be through the extension mechanism 122. Specifically, the extension mechanism 122 can rotate the telescoping platform 100 about ninety degrees from the transport position to the operating position as well as extend each of the N sections of the telescoping pole 110 vertically to raise or lower the platform 120.

FIG. 7 illustrates the telescoping pole 110 once raised from the transport position to the operating position. Note, in the transport position, the platform 120 is vertical, unable to support workers therein. The workers can enter and exit the platform 120 once the telescoping platform is initially raised from the transport position to the operating position, such as via the ladder 114. Of note, the workers here are only climbing M feet, e.g. 20' which generally does not have the same safety concerns as climbing a 200' cell tower 12.

The platform 120 can include a lockable door allowing the workers to enter a support cage since now in the initial operating position; the platform 120 is in the proper orientation to support the workers. The workers can lock the door, secure themselves in the support cage, and wait as the telescoping pole 110 is extended up the cell tower 12.

FIG. 8 illustrates the platform 120 in the transport position (left side) and rotated to the operating position (right side) to show how equipment 140 can be located in the platform 120. The equipment 140 is placed in the platform 120 in the transport position and secured in place with a securing mechanism 142, such as straps and a winch, or the like. For example, the equipment 140 can be an antenna, metal support rods, RF equipment, or the like. The equipment 140 can be placed in the platform 120 and secured as the mobile unit 102 is in transport.

The securing mechanism 142 is configured to both hold the equipment 140 during transport and to hold the equipment as the platform 120 is moved from the transport position to the operating position. The equipment 140 can weigh over 100 lbs in some embodiments. Thus, workers enter/exit the platform 120 as shown in FIG. 7 and equipment 140 is placed in the platform as shown in FIG. 8.

In an exemplary embodiment, a telescoping platform system 100 for providing workers and/or equipment up a cell tower 12 includes a telescoping pole 110 adapted to selectively extend vertically via an extension mechanism 122; a platform 120 disposed to a top of the telescoping pole 110 and adapted to support one or more workers and/or equipment 140 for the cell tower 12; and a plurality of support connections 112 to attach the telescoping pole 110 while it is selectively extended to the cell tower 12 to provide horizontal support to the telescoping pole 110 and the platform 120.

The telescoping pole 110 can include N sections each with a length M to provide an extension of the platform to a height of about N×M, wherein N and M are selected based on the one of a bed 130 and a trailer and a desired height for the cell tower 12. The telescoping pole 110 and the platform 120 are configured in a transport position substantially horizontal and an operating position substantially vertical. The workers enter and exit the platform in an initial operating position, and the equipment 140 is placed in the platform 120 in the transport position.

The workers are secured to the platform 120 via a safety harness. The plurality of support connections 112 can include one or more of tethers, clips, straps, arms, and robotic arms. The robotic arms, clips, and arms are automatically attached to the cell tower 12 as the telescoping pole 110 is selectively extended. The clips, tethers, arms, and straps are manually attached to the cell tower by one of the workers as the telescoping pole 110 is selectively extended. The cell tower 12 can include one of a monopole tower and a guyed tower with the plurality of support connections 112 attached thereto. The telescoping platform system can further include a mobile unit 102 including one of a trailer and a bed for transporting the telescoping pole and the platform attached thereto in a transport position.

The extension mechanism 122 can be further configured to rotate the telescoping pole 110 and the platform 120 attached thereto about ninety degrees between a transport position and an operating position. The telescoping pole 110 can include a plurality of sections with a ladder 114 attached to a first section allowing the workers to enter the platform 120 once the operating position is achieved. The platform 120 can include a securing mechanism 142 to hold the equipment 140 in the transport position.

In a further exemplary embodiment, a mobile unit 102 with a telescoping platform 100 for providing workers and/or equipment up a cell tower 12 includes one of a bed 130 and a trailer; a telescoping pole 110 on the one of the bed 130 and the trailer, wherein the telescoping pole 110 is adapted to selectively extend vertically via an extension mechanism 122; a platform 120 disposed to a top of the telescoping pole 110 and adapted to support one or more workers and/or equipment 140 for the cell tower 12; and a plurality of support connections 112 to attach the telescoping pole 110 while it is selectively extended to the cell tower 12 to provide horizontal support to the telescoping pole 110 and the platform 120.

Figure 9:
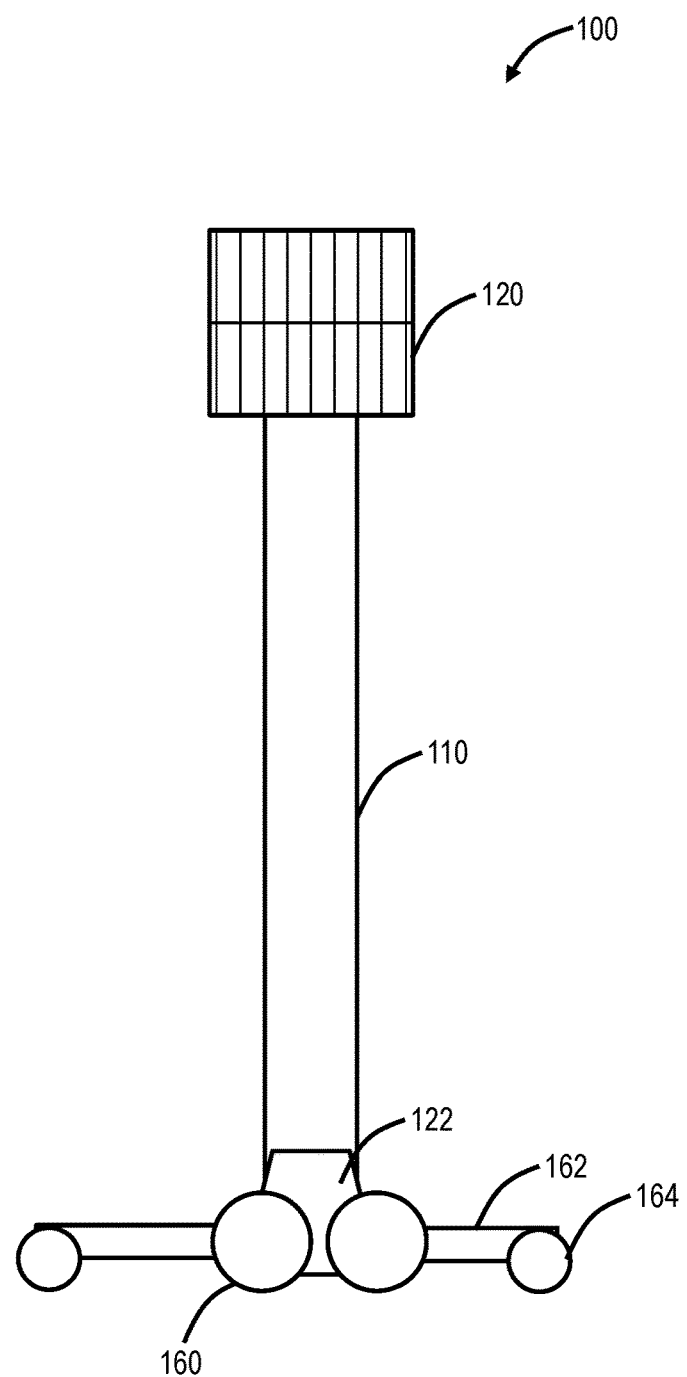
FIG. 9 is a perspective view of the telescoping platform in a mobile configuration to maneuver at the cell site.

Referring to FIG. 9, in an exemplary embodiment, a perspective view illustrates the telescoping platform 100 in a mobile configuration to maneuver at the cell site 10. Specifically, in this exemplary embodiment, the telescoping platform 100 includes wheels 160 such that the telescoping platform 100 can maneuver in tight spaces, over gravel, etc. such that it is positioned proximate to the cell tower 12. Here, the telescoping platform 100 can be brought to the cell site 10 via the mobile unit 102, offloaded and then moved to the cell tower 12.

In an exemplary embodiment, the extension mechanism 122 can include a motor or the like to drive the wheels 160. The telescoping platform 100 can be controlled via a remote, via a driver, via a mobile device, etc. In another exemplary embodiment, the telescoping platform 100 can be pulled by an All-Terrain Vehicle (ATV), a truck, etc. Of note, a crane has difficulties accessing the cell tower 12 based on current deployment practices, i.e., cell towers 12 are deployed typically around trees, with a narrow gravel ingress road, etc. The objective here is for the telescoping platform 100 to maneuver to the cell tower 12 vertically. It is expected that it would be difficult to bring a large truck to the cell tower 12 as well as associated risks.

The telescoping platform 100 can also include stabilizing arms 162 and wheels 164 that can be selectively extended or removed to provide stabilization as the telescoping platform 100 is maneuvered to the cell tower 12. The stabilizing arms 162 and wheels 164 ensure the telescoping platform 100 does not topple over as it stands vertically during maneuvering. The stabilizing arms 162 and wheels 164 can be stored or removed in the transport position.

In another exemplary embodiment, the telescoping platform 100 can have the wheels on the telescoping pole 110 allowing the telescoping platform 100 to maneuver in the transport position, i.e., the telescoping pole 110 is horizontal. Here, the extension mechanism 122 can rotate the telescoping pole 110 once the telescoping platform is in the desired position. The wheels on the telescoping pole 110 can be removed or remain in place in the operating position.

§ 3.0 Telescoping Platform Method

Figure 10:
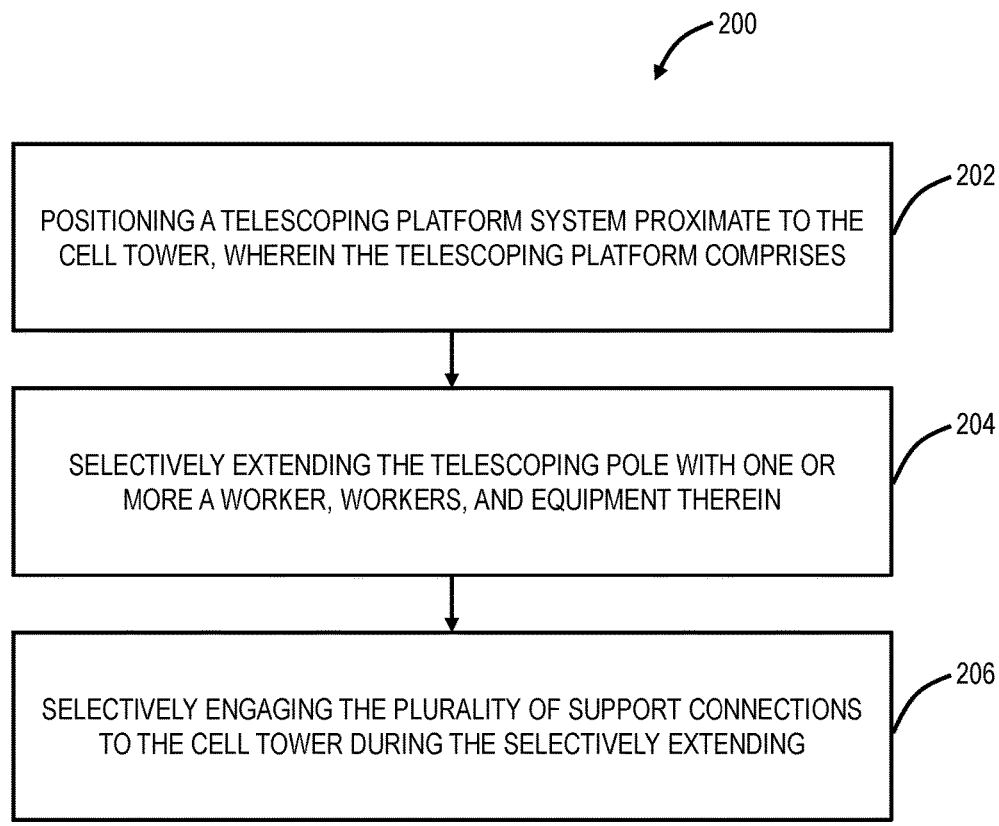
FIG. 10 is a flowchart of a method for performing operations on a cell tower with a telescoping platform.

Referring to FIG. 10, in an exemplary embodiment, a flowchart illustrates a method 200 for performing operations on a cell tower 12 with a telescoping platform 100. The method 200 includes positioning a telescoping platform system proximate to the cell tower (step 202). The telescoping platform includes a telescoping pole 110 adapted to selectively extend vertically via an extension mechanism 122; a platform 120 disposed to a top of the telescoping pole 110 and adapted to support one or more workers and/or equipment 140 for the cell tower 12; and a plurality of support connections 112 to attach the telescoping pole 110 while it is selectively extended to the cell tower 12 to provide horizontal support to the telescoping pole 110 and the platform 120. The method 200 further includes selectively extending the telescoping pole with one or more a worker, workers, and equipment therein (step 204); and selectively engaging the plurality of support connections to the cell tower during the selectively extending (step 206).

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A telescoping platform system for providing workers and/or equipment up a cell tower, the telescoping platform comprising:
    a telescoping pole adapted to selectively extend vertically via an extension mechanism;
    a platform disposed to a top of the telescoping pole and adapted to support workers and equipment for the cell tower; and
    a plurality of support connections to attach the telescoping pole while it is selectively extended to the cell tower to provide horizontal support to the telescoping pole and the platform,
    wherein the telescoping pole comprises N sections each with a length M to provide an extension of the platform to a height of about N×M, wherein N and M are selected based on the one of a bed and a trailer and a desired height for the cell tower, and wherein N and M are selected to extend at least 100 feet,
    wherein the telescoping pole and the platform are configured in a transport position substantially horizontal and an operating position substantially vertical, and wherein the platform comprises a securing mechanism for holding the equipment in either position and during transport, and
    wherein the cell tower is one of a monopole tower and a guyed tower, and wherein the telescoping pole is configured to attach to the cell tower via a plurality of support connections as the telescoping pole extends and is configured to detach from the cell tower at the plurality of support connections as the telescoping pole descends.

2. The telescoping platform system of claim 1, wherein the plurality of support connections comprise one or more of clips, arms, and robotic arms.

3. The telescoping platform system of claim 2, wherein the plurality of support connections comprise one of the robotic arms, clips, and arms which are automatically attached to the cell tower as the telescoping pole is selectively extended.

4. The telescoping platform system of claim 1, further comprising:
a mobile unit comprising one of a trailer and a bed for transporting the telescoping pole and the platform attached thereto in a transport position.

5. The telescoping platform system of claim 1, wherein the extension mechanism is further configured to rotate the telescoping pole and the platform attached thereto about ninety degrees between a transport position and an operating position.

6. The telescoping platform system of claim 5, wherein the telescoping pole comprises a plurality of sections with a climbing mechanism attached to a first section allowing the workers to enter the platform once the operating position is achieved.

7. The telescoping platform system of claim 1, further comprising:
wheels attached to a base of the telescoping platform for maneuvering once at a cell site to the cell tower.

8. A mobile unit with a telescoping platform for providing workers and/or equipment up a cell tower, the mobile unit comprising:
one of a bed and a trailer;
a telescoping pole on the one of the bed and the trailer, wherein the telescoping pole is adapted to selectively extend vertically via an extension mechanism;
a platform disposed to a top of the telescoping pole and adapted to support workers and equipment for the cell tower; and
a plurality of support connections to attach the telescoping pole while it is selectively extended to the cell tower to provide horizontal support to the telescoping pole and the platform,
wherein the telescoping pole comprises N sections each with a length M to provide an extension of the platform to a height of about N×M, wherein N and M are selected based on the one of the bed and the trailer and a desired height for the cell tower, and wherein N and M are selected to extend at least 100 feet,
wherein the extension mechanism is further configured to rotate the telescoping pole and the platform attached thereto about ninety degrees between a transport position and an operating position, and wherein the platform comprises a securing mechanism for holding the equipment in either position and during transport, and
wherein the cell tower is one of a monopole tower and a guyed tower, and wherein the telescoping pole is configured to attach to the cell tower via a plurality of support connections as the telescoping pole extends and is configured to detach from the cell tower at the plurality of support connections as the telescoping pole descends.

9. The mobile unit of claim 8, wherein the telescoping pole comprises a plurality of sections with a climbing mechanism attached to a first section allowing the workers to enter the platform once the operating position is achieved.

* * * * *